No. 704,029. Patented July 8, 1902.
O. W. GRIFFITHS.
BICYCLE.
(Application filed May 14, 1896.)

(No Model.)

Attest:
Lo. H. Grote
Edgeworth Greene

Inventor:
Oliver W. Griffiths
by Worth Osgood
Atty.

THE NORRIS PETERS CO., PHOTO-LITHO., WASHINGTON, D. C.

UNITED STATES PATENT OFFICE.

OLIVER W. GRIFFITHS, OF BROOKLYN, NEW YORK.

BICYCLE.

SPECIFICATION forming part of Letters Patent No. 704,029, dated July 8, 1902.

Application filed May 14, 1896. Serial No. 591,505. (No model.)

*To all whom it may concern:*

Be it known that I, OLIVER W. GRIFFITHS, a citizen of the United States, and a resident of Brooklyn, in the county of Kings and State of New York, have invented certain new and useful Improvements in Bicycles, of which the following is a specification.

My invention relates to bicycles, and has for its object the construction of vehicles of this class in such manner that they may be propelled by the arms and hands and steered by the feet of the rider instead of the reverse, as is now the ordinary custom. To accomplish this object and to secure other and further advantages in the matters of construction, operation, and use, my improvements involve certain new and useful arrangements or combinations of parts and peculiarities of construction, as will be herein first fully described and then pointed out in the claims.

Figure 1:
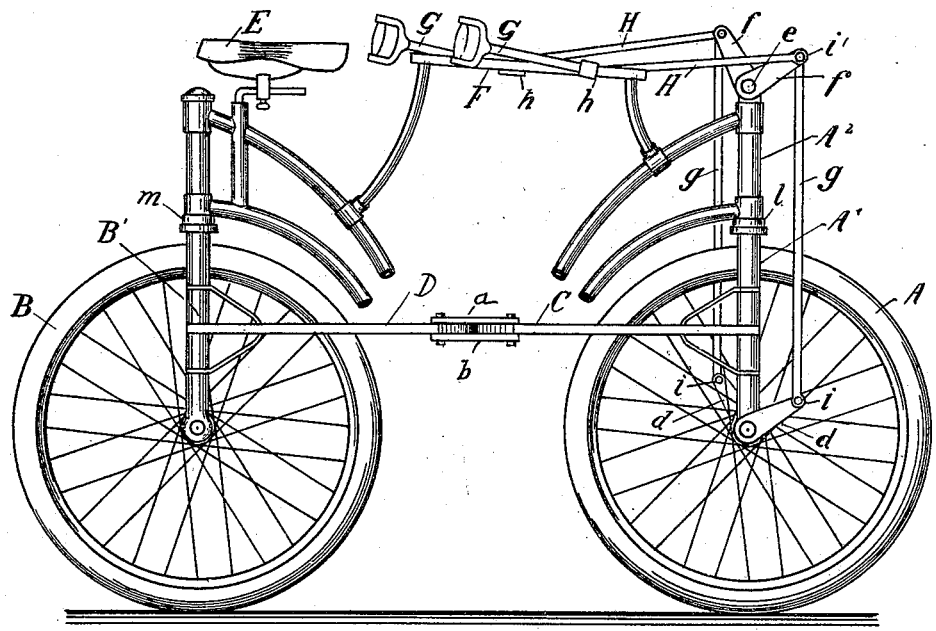
Figure 2:
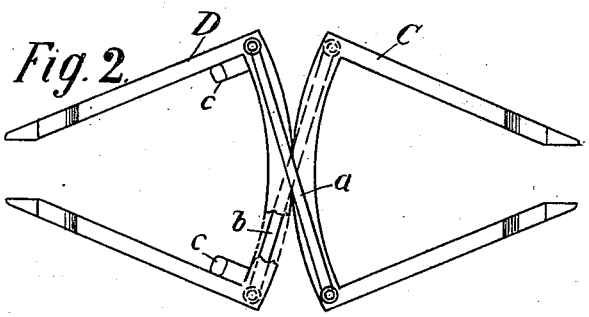

In the accompanying drawings, forming part of this specification, Figure 1 is a side view representing a bicycle constructed and arranged in accordance with my invention and involving my improvements. Fig. 2 is a plan view showing the means for connecting the wheels, but omitting other parts.

In both the figures like letters of reference wherever they occur indicate corresponding parts.

A is the forward wheel, and B the rear one, the two being mounted in any approved form of frame, but the posts in which they are axled being both capable of turning, so that in steering both wheels are employed instead of one, as is now the usual custom. Under such an arrangement it is plain that if the two wheels are so connected that they must turn simultaneously, but in opposite directions and in substantially equal degree, then the forward wheel need only be turned about half as far as would be required if it alone were relied upon for steering.

A' is the forked post for the forward wheel, and B' that for the rear wheel, and both of these are mounted in the frame so as to turn therein.

C is an arc or frame affixed to the forward wheel-post, and this is connected with another arc or frame D, united with the post of the rear wheel. That the two arcs or frames must turn together they are each provided with links uniting one with the other, so that when one wheel is turned or deflected in one direction the other wheel will be forced equally far in the opposite direction. The connecting-links are shown at $a$ and $b$, one above and the other below the arcs, the links being crossed and united with the arcs at their extremities, as best shown in Fig. 2. It is intended that the operator shall do the steering with the feet, and for that purpose the feet are placed upon one or the other of the two arcs or frames—as, for instance, against footrests, as at $c\ c$. A very slight movement of either foot will be sufficient to deflect the wheels as may be required. Of course the arcs are to be firmly affixed to the wheel-posts, and they may be braced in any suitable manner.

E is the rider's saddle, mounted in any approved way.

The bicycle is to be propelled by the hands and arms. At $d\ d$ are cranks upon the axle of the forward wheel. The post A' extends up through the forward post A² of the frame and turns therein, as usual. Upon the top of post A' and above post A² is the shaft $e$, upon which are cranks $f\ f$, corresponding in length with those at $d\ d$. This shaft may be applied in any suitable way; but it preferably passes through the top of the post, as indicated in Fig. 2. The cranks $d\ d$ are connected with cranks $f\ f$ by suitable connecting-rods, as $g\ g$, or by other mechanical means suitable for the purpose.

F F are stationary guides applied in some substantial way upon the frame. Upon these ride the slides $h\ h$, to which are applied the handpieces G G, carrying suitable handles, and slide-rods H H, uniting the slides with cranks $f\ f$. At $i\ i$, $i'\ i'$, and $k\ k$ are ball-and-socket or other suitable forms of universal joints. By moving the handpieces back and forth the cranks $f$ and $d$ are turned, and therefore the forward wheel revolved, as will be readily understood.

Ball-bearings are to be employed, as is usual in this class of vehicles, and particularly at the points $l$ and $m$.

The wheels may be turned to the right or left through any degree until the connecting-rods or connecting means strike against the frame, and since they turn in opposite directions the extent of movement provided for is ample for all ordinary purposes of steering.

The use of the improved form of bicycle is calculated to develop the muscles of the arms instead of those of the legs. With practice the steering may be done wholly through the driving appliances, in which case the feet will only be used to steady the machine.

The friction on the driving parts when properly constructed will be very little, and the vehicle is well adapted for racing purposes. The steering arrangement may be protected after the usual manner to adapt the vehicle for women's use.

The improvements are simple and not expensive to construct, and the vehicle is well calculated to answer the purposes or objects of the invention herein alluded to.

Having now fully described my invention, what I claim as new herein, and desire to secure by Letters Patent, is—

1. In a bicycle, the two wheels, each mounted in a separate turning post at the extremity of the vehicle-frame, and two arcs connected by cross-links, a, b, one of which arcs is arranged to support the feet of the rider, substantially as explained, the turning of one arc with the feet compelling the turning of the other in the opposite direction, for the purpose of steering, the whole vehicle being arranged to be propelled by the hands and arms, for the objects set forth.

2. In a bicycle, the wheels mounted in turning posts located at the extremities of the vehicle-frame and the two arcs connected by cross-links, a, b, as explained, the forward wheel being arranged to be driven by the hands and arms of the rider from a shaft on the top of its post, said shaft being connected with the axle of the wheel, and the wheel-connecting arcs arranged to be moved simultaneously but in opposite direction by the feet of the rider supported on one of the said arcs, the whole being combined and arranged for operation substantially as and for the purposes set forth.

Signed at New York, in the county and State of New York, this 12th day of May, A. D. 1896.

OLIVER W. GRIFFITHS.

Witnesses:
W. J. MORGAN,
WORTH OSGOOD.